(12) United States Patent
Miyazaki et al.

(10) Patent No.: US 7,988,243 B2
(45) Date of Patent: Aug. 2, 2011

(54) BRAKE CONTROLLER

(75) Inventors: Tetsuya Miyazaki, Toyota (JP); Yoshiaki Irie, Chiryu (JP); Rio Suda, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1058 days.

(21) Appl. No.: 11/674,774

(22) Filed: Feb. 14, 2007

(65) Prior Publication Data

US 2007/0210647 A1 Sep. 13, 2007

(30) Foreign Application Priority Data

Mar. 10, 2006 (JP) ................. 2006-065560

(51) Int. Cl.
*B60T 8/60* (2006.01)
(52) U.S. Cl. ..................................... 303/155
(58) Field of Classification Search .................. 303/155, 303/3, 15, 20
See application file for complete search history.

(56) References Cited

U.S. PATENT DOCUMENTS

| | | | |
|---|---|---|---|
| 4,712,839 A | 12/1987 | Brearley et al. | |
| 6,460,943 B1 * | 10/2002 | Toepfer et al. | 303/155 |
| 6,859,712 B2 * | 2/2005 | Walenty et al. | 701/71 |

FOREIGN PATENT DOCUMENTS

| | | |
|---|---|---|
| EP | 0 205 277 A2 | 12/1986 |
| EP | 1 466 799 A1 | 10/2004 |
| JP | 62-18359 | 1/1987 |
| JP | 8-324416 | 12/1996 |

* cited by examiner

*Primary Examiner* — Robert Siconolfi
*Assistant Examiner* — Vu Q Nguyen
(74) *Attorney, Agent, or Firm* — Oblon, Spivak, McClelland, Maier & Neustadt, L.L.P.

(57) ABSTRACT

A brake controller is provided that includes a braking force application mechanism that presses a friction member against a braked member so as to apply a braking force to a wheel of a vehicle; and a control unit. The control unit calculates an index, which indicates a difference between an expected braking effectiveness and an actual braking effectiveness, corrects a target value, which is set to control a pressing force of the friction member, in accordance with the index to reduce a variation in a braking effectiveness of the vehicle. The control unit further sets a variation range in accordance with a factor that causes the difference. The variation range limits a variation in a correction amount to correct the target value.

16 Claims, 7 Drawing Sheets

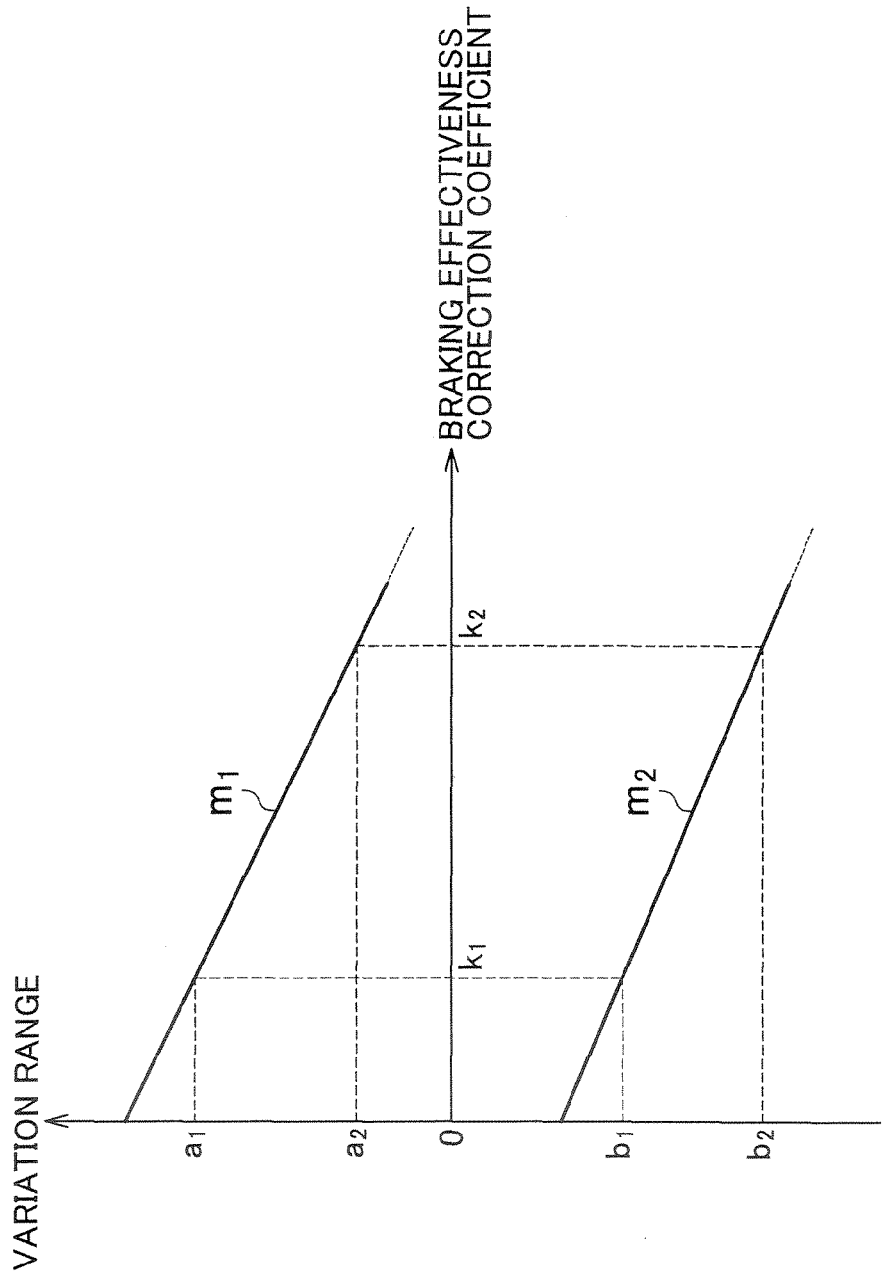

BRAKE CONTROLLER

INCORPORATION BY REFERENCE

The disclosure of Japanese Patent Application No. 2006-65560 filed on Mar. 10, 2006 including the specification, drawings and abstract is incorporated herein by reference in its entirety.

BACKGROUND OF THE INVENTION

1. Field of the Invention

The present invention relates to a brake controller that controls the braking force applied to the wheel of a vehicle.

2. Description of the Related Art

A conventional electronically controlled brake control system for a vehicle (for example, in Japanese Patent Application Publication No. 62-18359 (1987)) generates a deceleration error signal by comparing the driver braking request signal with the measured deceleration. This brake system further has a means for correcting the braking request signal that generates an adaptive coefficient from the deceleration error signal and corrects the braking request signal by using an adaptive coefficient under prescribed conditions, such as vehicle speed, brake level, and operating inclination, of over a plurality of stoppings of the vehicle. The brake system compensates for brake deterioration over an extended period of time and restores desired brake performance.

However, the measured deceleration error may vary in response to factors other than brake deterioration, such as the variations in the vehicle operating conditions, for example, the environmental temperature, external disturbances and the occurrence of abnormalities. Because of this, the adaptive coefficients obtained from the deceleration level error signal may be difficult to appropriately characterize as reflecting (resulting from) only the deterioration of the brake over an extended period of time. In such a case, the use of an adaptive coefficient does not necessarily compensate for long-term brake deterioration and stabilization of the braking effectiveness.

SUMMARY OF THE INVENTION

Given the foregoing, the present invention provides a brake controller that stabilizes braking effectiveness.

One aspect of the present invention provides a brake controller that includes a braking force application mechanism that presses a friction member against a braked member so as to apply a braking force to a wheel of a vehicle. The brake controller also includes a control unit that calculates an index that indicates the difference between the expected braking effectiveness and the actual braking effectiveness. The control unit corrects the target value, which is set to control a pressing force of the friction member, in accordance with the index to reduce variation in the braking effectiveness of the vehicle. The control unit further sets a variation range in accordance with a factor that causes the difference. The variation range limits a variation in the correction amount to correct the target value.

According to this aspect, the target value that may be corrected by the control unit includes, for example, the target deceleration, the target pressure or the like. The control unit corrects the target value in accordance with the index to reduce the variation in the braking effectiveness of the vehicle. By doing this, it is possible to stabilize the braking effectiveness and suppress a feeling of unnaturalness imparted to the driver when braking. The magnitude of or time variations in deceleration or braking force, for example, may be used as a quantity indicating the braking effectiveness.

The controller sets the variation range of the correction amount in accordance with factors that causes the difference, such as, for example, abrasion of friction members or the like. For example, the difference may increase and exceed the amount of difference expected from the factors, due to external disturbances, abnormality of the vehicle, or the like. Accordingly, by appropriately setting the variation range of the correction amount in accordance with the factors that causes the difference, the variation in the correction amount can be limited within the set variation range, even if the difference is unexpectedly increased. Accordingly, unexpected variations in the correction amount can be suppressed, and thus, the braking effectiveness can be stabilized.

The control unit may set the variation range so that the variation in the correction amount necessary to compensate for the long-term increase in the difference is within the variation range. There are many factors that cause the difference in the braking effectiveness. For example, the abrasion of the friction member gradually increases the difference over a long term. According to the above, because the variation range of the correction amount is set to compensate the long-term increase in the difference in the braking effectiveness, the long-term variation in the braking effectiveness can be reduced, and unexpected variations in the correction amount, which exceed the set variation range, can be limited.

Alternatively, the control unit may accept the variation in the correction amount that exceeds the variation range, when the difference between the expected braking effectiveness and the actual braking effectiveness is increased by a temporary factor expected during a use of the vehicle. For example, the temporary factors, such as the change in the vehicle weight, the change in the temperature of the friction member, or the like, which are expected to occur during the use of the vehicle, sometimes increase the difference in the braking effectiveness on a short term basis. Such increases in the difference in the short term may increase a feeling of unnaturalness imparted to the driver. It is desirable to reduce such a feeling of unnaturalness imparted to the driver. As described above, by accepting the variation in the correction amount that exceeds the variation range, temporary variations in the braking effectiveness can be reduced during the use of the vehicle.

In this case, it may also possible that the variation range of the correction amount is expanded, when the difference is increased by the temporary factor expected in the use of the vehicle. By doing this as well, larger variations in the correction amount can be accommodated, as compared with before the variation range is expanded. Accordingly, temporary variations in the braking effectiveness may be reduced during the use of the vehicle.

The control unit may detect the increase in the vehicle weight as the temporary factor, and may increase the variation range after the increase in the vehicle weight is eliminated, as compared with the variation range before the increase in the vehicle weight. Generally, as the vehicle weight increases, the braking effectiveness decreases. As such, the braking effectiveness may be increased by correction and is returned to the braking effectiveness before the vehicle weight increased. However, in contrast, when the once-increased vehicle weight is decreased and the braking effectiveness is thus increased, a favorable brake feeling sometimes cannot be obtained if the braking effectiveness is decreased by the correction. According to the above, because the variation range of the correction amount increased after the once-increased vehicle weight is decreased, as compared with the variation range of the correction amount before the vehicle weight is increased, a sudden decrease of the braking effectiveness can be suppressed when the vehicle weight is decreased. Therefore, an unnaturalness of the brake feeling can be reduced.

The control unit may determine that the factor is the change in the vehicle weight, when the index indicating the difference suddenly exceeds the predetermined reference value. It is experimentally understood that changes in vehicle weight is an important factor that causes sudden variations in the index indicating the difference in the braking effectiveness. Accordingly, it is possible to determine that the factor is the change in the vehicle weight, when the index suddenly changes by a large amount and exceeds the predetermined reference value.

The braking force application mechanism may press the friction member to the braked member by supplying a hydraulic fluid. The control unit may calculate an actual hydraulic pressure deceleration caused by the braking force application mechanism from a measure deceleration of the vehicle. The control unit may further calculate an estimated hydraulic pressure deceleration using the hydraulic pressure supplied by the braking force application mechanism, and correct the target value in accordance with a difference between the estimated hydraulic pressure deceleration and the actual hydraulic pressure deceleration.

That is, the control unit uses the estimated hydraulic pressure deceleration as the estimated braking effectiveness, and uses the difference between the estimated hydraulic pressure deceleration and the actual hydraulic pressure deceleration as the index indicating the difference between the estimated braking effectiveness and the actual braking effectiveness. By eliminating deceleration by factors other than hydraulic pressure braking from the measured deceleration of the vehicle, and using the difference between the actual deceleration caused by hydraulic pressure braking and the estimated deceleration presumed to be caused by hydraulic pressure braking in this manner, it is possible to evaluate the variations in braking effectiveness with improved accuracy.

The control unit changes the correction amount to the preset value, when the sudden change in the actual braking effectiveness is expected. According to this, the control unit changes the correction amount to the preset value after, for example, the maintenance operation of the braking force application mechanism, by which a sudden change in the actual braking effectiveness is expected. By doing this, the sudden change in the braking effectiveness can be suppressed.

In this case, the control unit may reset the correction amount to the initial value. For example, when the brake pad, brake disc and the like are replaced with new ones in the maintenance operation, the correction for compensating for the abrasion of the brake pad etc. is unnecessary. Under this circumstance, maintaining the correction amount before the (maintenance) operation may cause a sudden change in the braking effectiveness. Accordingly, by resetting the correction amount to the initial value, the sudden change in the braking effectiveness can be suppressed.

Further, the control unit may change the correction amount so that the correction amount approaches the initial value. For example, when the correction amount is relatively large and such a correction amount is suddenly reset to the initial value, the braking effectiveness may rather be changed suddenly. Under this circumstance, by adjusting the correction amount to approach the initial value, the sudden change in the braking effectiveness can be suppressed.

The control unit may change the variation range of the correction amount in accordance with the change in the tire diameter. The changes in tire diameter is one of the factors that increases the variation in the braking effectiveness on a long-term basis. Accordingly, when the variation range of the correction amount is changed in accordance with the changes in the tire diameter, the long-term variations in the braking effectiveness can be reduced, and an unexpected change in the correction amount that exceeds the set variation range can be restricted.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 7 is a view illustrating an example of relationship between the correction coefficient and the variation range.

DETAILED DESCRIPTION OF THE PREFERRED EMBODIMENTS

An embodiment of the present invention is described in detail below, with references made to the drawings.

Figure 1:
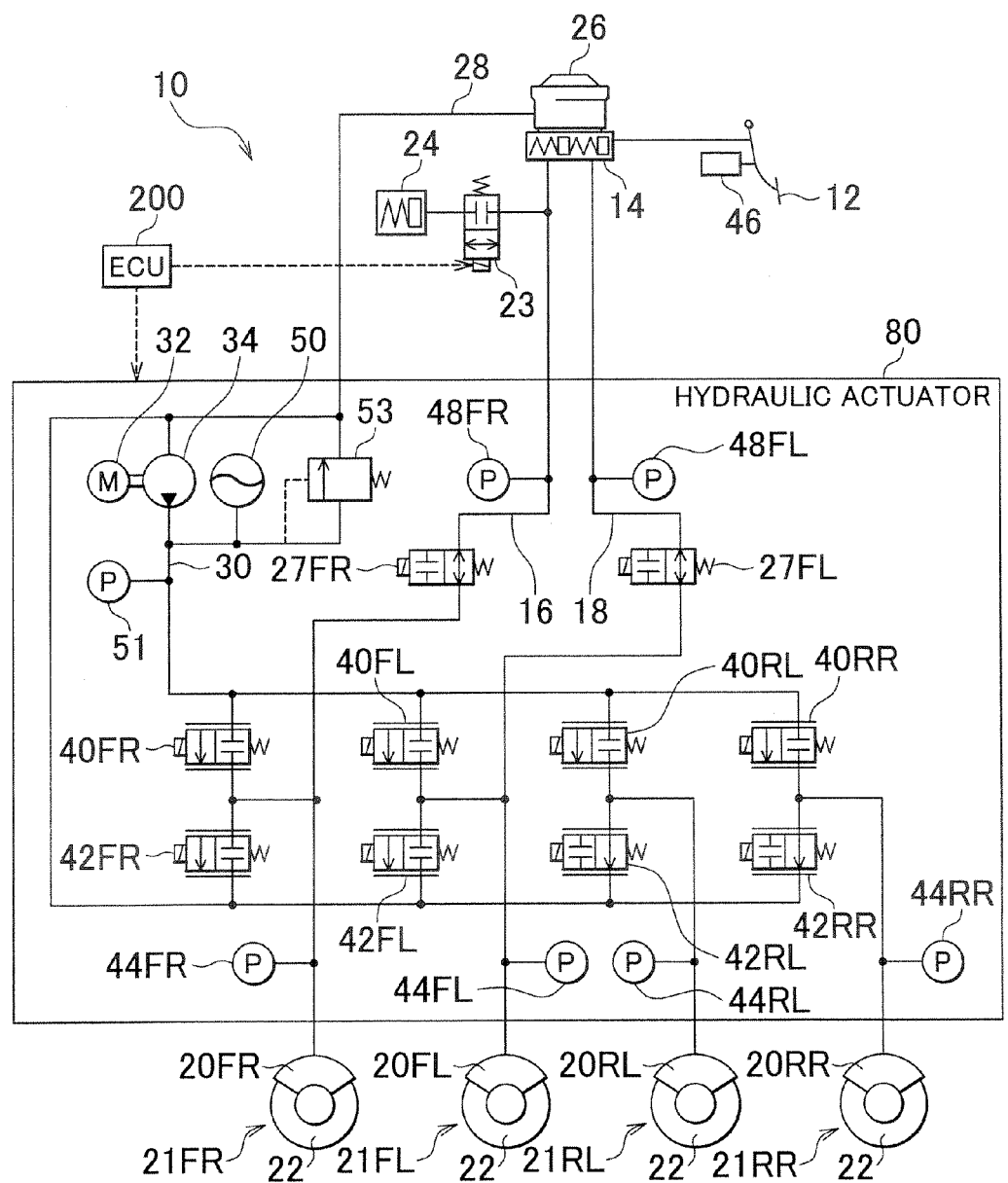
FIG. 1 shows a schematic view of a brake controller according to an embodiment of the present invention.

FIG. 1 is a schematic view of a brake controller 10 according to an embodiment of the present invention. The brake controller 10 shown in FIG. 1 is an electronically controlled brake system for a vehicle, in which the brakes of the four wheels of the vehicle are independently and optimally set in response to the operation of a brake operating member, such as a brake pedal 12. The vehicle into which the brake controller 10 of this embodiment is installed has a steering device (not illustrated) that steers the steered wheels of the four wheels, and a drive source (not illustrated) such as an internal combustion engine or motor or the like that drives the driving wheels of the four wheels of the vehicle.

The disc brake units 21FR, 21FL, 21RR, 21RL, which are the braking force application mechanisms, apply braking force to the front-right wheel, the front-left wheel, the rear-right wheel, and the rear-left wheel, respectively, of the vehicle. Each of the disc brake units 21FR to 21RL includes a brake disc 22 and one of the wheel cylinders 20FR to 20RL inside a brake caliper. The wheel cylinders 20FR to 20RL are each connected to a hydraulic actuator 80 via a different fluid passage, respectively. In the description that follows, as a convenience the wheel cylinders 20FR to 20RL will be collectively referred to as the "wheel cylinder 20."

In the disc brake units 21FR to 21RL, when brake fluid is supplied to the wheel cylinder 20 from the hydraulic actuator 80, a friction member such as a disc pad is pressed against a braked member such as the brake disc 22, which rotates together with the wheel. When this occurs, braking force is applied to each of the wheels. Although this embodiment uses disc brake units 21FR to 21RL, a different braking force application mechanism, including a wheel cylinder of, for example, a drum brake, may be used. Alternatively, rather than controlling the pressing force of a friction member by a fluid force, a braking force application mechanism that controls the pressing force of a friction member against a wheel using an electrically driven mechanism, such as an electric motor, may be used.

The brake pedal 12 is connected to a master cylinder 14 that sends out brake fluid as an operating fluid in response to the depression of the brake by the driver. The brake pedal 12 is provided with a stroke sensor 46 for detecting the depression stroke thereof. One output port of the master cylinder 14 is connected to a stroke simulator 24 that generates a reaction force in response to the operating force of the brake pedal 12 by the driver. A simulator cutoff valve 23 is provided midway in the fluid passage between the master cylinder 14 and the stroke simulator 24. The simulator cutoff valve 23 is a normally closed electromagnetic valve, which is closed when not electrically powered, and opens when operation of the brake pedal 12 by the driver is detected. The master cylinder 14 is connected to a reservoir tank 26 for storing brake fluid.

Another output port of the master cylinder 14 is connected to a front-right wheel brake hydraulic control pipe 16. The brake hydraulic control pipe 16 is connected to the wheel cylinder 20FR for the front-right wheel for the application of braking force to the front-right wheel (not illustrated). Yet another output port of the master cylinder 14 is connected to a front-left wheel brake hydraulic control pipe 18. The brake hydraulic control pipe 18 is connected to the wheel cylinder 20FL for the front-left wheel for the application of braking force to the front-left wheel (not illustrated). A right master cutoff value 27FR is provided midway in the front-right wheel brake hydraulic control pipe 16 and a left master cutoff valve 27FL is provided midway in the front-left wheel brake hydraulic control pipe 18. The right master cutoff valve 27FR and the left master cutoff valve 27FL and are normally opened electromagnetic valves, which are opened when not electrically powered and switch to the closed condition when operation of the brake pedal 12 by the driver is detected.

A right master pressure sensor 48FR is provided midway in the right-front wheel brake hydraulic control pipe 16 to detect the master cylinder pressure for the front-right wheel, and a left master pressure sensor 48FL is provided midway in the front-left wheel brake hydraulic control pipe 18 to detect the master cylinder pressure for the front-left wheel. Although in the brake controller 10, when the brake pedal 12 is depressed by the driver, the amount of depression operation is detected by the stroke sensor 46, it is also possible to determine the force of depression operation of the brake pedal 12 (depressing force) from the master cylinder pressure detected by the right master pressure sensor 48FR and the left master pressure sensor 48FL. Monitoring the master cylinder pressure using the two pressure sensors 48FR and 48FL in the event of a failure of the stroke sensor 46 is preferable from the standpoint of failsafe operation. Also, in the following description, the right master pressure sensor 48FR and the left master pressure sensor 48FL are sometimes referred to collectively as the "master cylinder pressure sensors 48."

One end of a hydraulic feed/drain pipe 28 is connected to the reservoir tank 26, and the other end of this hydraulic feed/drain pipe 28 is connected to the intake port of an oil pump 34 that is driven by a motor 32. The drain port of the oil pump 34 is connected to a high-pressure pipe 30, and the high-pressure pipe 30 is connected to an accumulator 50 and a relief valve 53. In this embodiment, the oil pump 34 is a reciprocating pump having two or more pistons (not illustrated) that are respectively moved reciprocally by the motor 32. The accumulator 50 stores the pressure energy of the brake fluid by converting it to pressure energy of a filling gas of nitrogen or the like.

The accumulator 50 stores brake fluid with the pressure elevated to, for example, approximately 14 to 22 MPa by the oil pump 34. The valve output of the relief valve 53 is connected to the hydraulic feed/drain pipe 28, and when the pressure of the brake fluid in the accumulator 50 rises abnormally to, for example, approximately 25 MPa, the relief valve 53 opens, and the high-pressure brake fluid is returned to the hydraulic feed/drain pipe 28. Also, the high-pressure pipe 30 is provided with an accumulator pressure sensor 51 that detects the output pressure from the accumulator 50, which is the pressure of the brake fluid in the accumulator 50.

The high-pressure pipe 30, via the pressure booster valves 40FR, 40FL, 40RR, 40RL, is connected to the front-right wheel cylinder 20FR, the front-left wheel cylinder 20FL, the rear-right wheel cylinder 20RR, and the rear-left wheel cylinder 20RL. In the following description, the pressure booster valves 40FR to 40RL are sometimes collectively referred to as the pressure booster valves 40. Each of the pressure booster valves 40 is a normally closed electromagnetic flow-controlled valve (linear valve), which is closed when not electrically powered, and is used to boost the pressure of the wheel cylinder 20 as needed.

The front-right wheel cylinder 20FR and the front-left wheel cylinder 20FL are connected to the hydraulic feed/drain pipe 28 via the pressure-reduction valves 42FR and 42FL, respectively. The pressure reduction valves 42FR and 42FL are normally closed electromagnetic flow control valves (linear valves) used to reduce the pressure in the wheel cylinders 20FR and 20FL as necessary. The rear-right wheel cylinder 20RR and the rear-left wheel cylinder 20RL are connected to the hydraulic feed/drain pipe 28 via the pressure reduction valves 42RR and 42RL, respectively, which are normally open electromagnetic flow control valves. In the following description, the pressure reduction valves 42FR to 42RL are sometimes referred to collectively as the "pressure reduction valves 42."

Wheel cylinder pressure sensors 44FR, 44FL, 44RR, 44RL detect the wheel cylinder pressure that is the pressure of the brake fluid acting on the respective wheel cylinders 20, and are provided in the vicinity of the front-right, front-left, rear-right, and rear-left wheel cylinders 20FR to 20RL. In the description that follows, the wheel cylinder pressure sensors 44FR to 44RL are sometimes referred to collectively as the "wheel cylinder pressure sensors 44."

The above-described right master cutoff valve 27FR and left master cutoff valve 27FL, the pressure booster valves 40FR to 40RL, the pressure reduction valves 42FR to 42RL, the oil pump 34, and the accumulator 50 and the like constitute a hydraulic actuator 80 of the brake controller 10. The hydraulic actuator 80 is controlled by the electronic control unit (hereinafter "ECU") 200, which is the control unit of this embodiment. The ECU 200 includes a CPU that executes various calculation processes, a ROM into which various control programs are stored, a RAM used for data storage and used as a working area for program execution, an input/output interface, and a memory or the like.

Figure 2:
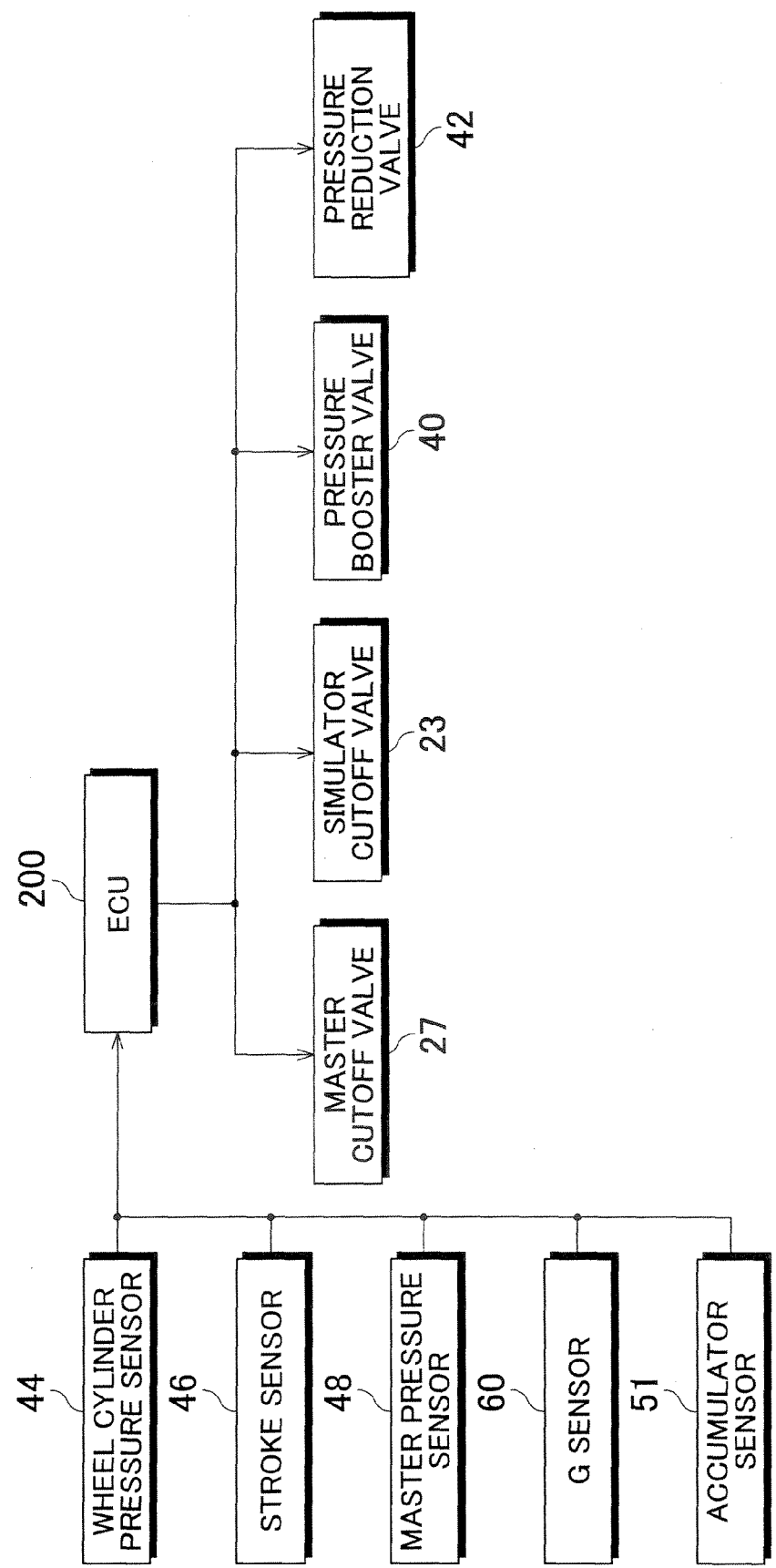
FIG. 2 shows a control block diagram according to the embodiment of FIG. 1.

FIG. 2 is a control block diagram according to this embodiment. The above-described master cutoff valves 27FR, 27FL, the simulator cutoff valve 23, the pressure booster valves 40FR to 40RL, and the pressure reduction valves 42FR to 42RL and the like are electrically connected to the ECU 200. The ECU 200 receives signals from the wheel cylinder pressure sensor 44FR to 44RL indicating the wheel cylinder pressures of the wheel cylinders 20FR to 20RL. Additionally, the ECU 200 receives a signal from the stroke sensor 46 indicating the pedal stroke of the brake pedal 12, and also receives signals from the right master pressure sensor 48FR and the left master pressure sensor 48FL indicating the master cylinder pressures. The ECU 200 also receives a signal from the accumulator pressure sensor 51 indicating the accumulator pressure. A G sensor (An accelerometer) 60 is electrically connected to the ECU 200 and supplies to the ECU 200 a signal indicating the acceleration or deceleration of the vehicle.

Figure 3:
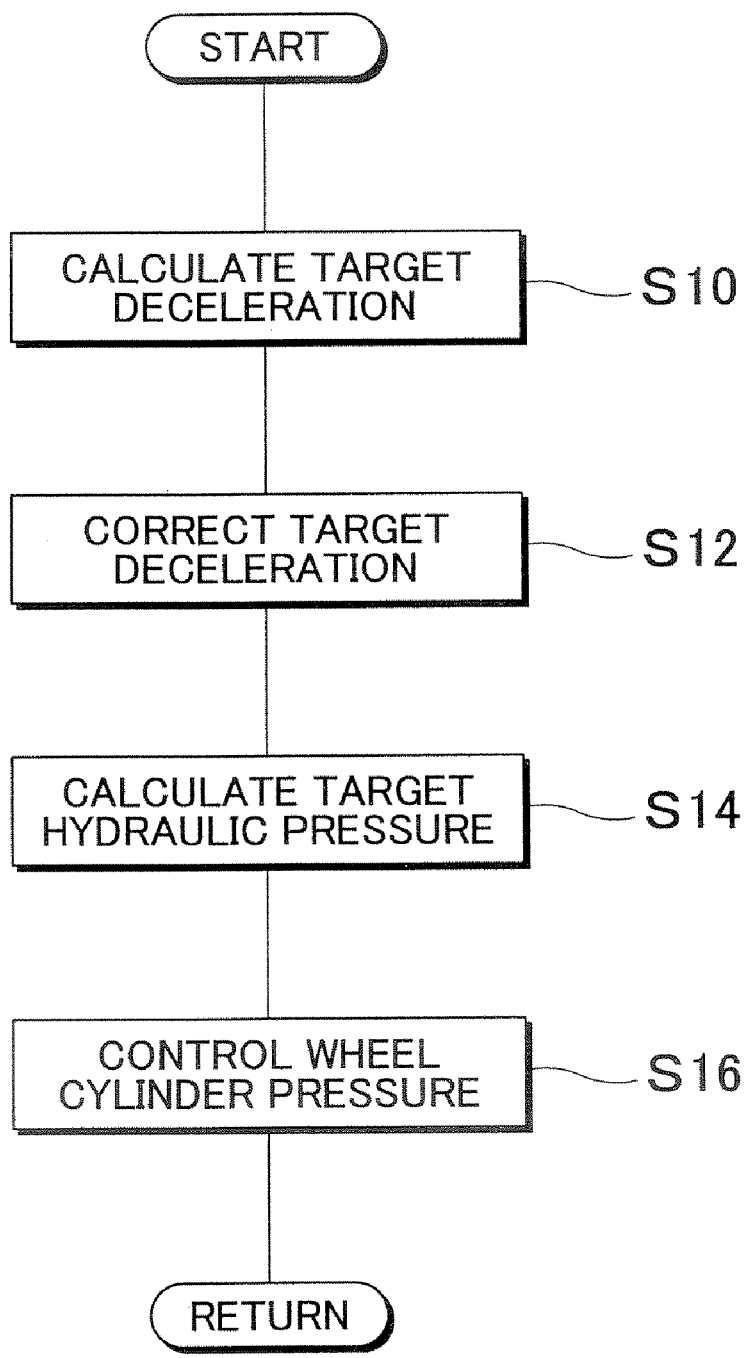
FIG. 3 shows a flowchart indicating an example of control process for the braking force in the embodiment of FIG. 1.

In the brake controller 10 configured in this manner, the ECU 200 controls the wheel cylinder pressure and the braking force that is applied to the wheels. FIG. 3 is a flowchart showing an example of braking force control process in this embodiment. The process shown in FIG. 3 is executed at prescribed intervals after the generation of a braking request signal, such as the depression of the brake pedal 12 by the driver, this being, for example, every 3 to 6 ms.

As shown in FIG. 3, upon receiving the braking request signal, the ECU 200 first calculates a target deceleration based on the depression stroke of the brake pedal 12 and the master cylinder pressure (S10). The ECU 200 then corrects the target deceleration, based on the learned (previously calculated and stored) braking effectiveness, so that the variation in the braking effectiveness is reduced (S12). Specifically, the ECU 200 performs the correction by multiplying the target deceleration by a braking effectiveness correction coefficient. The braking effectiveness coefficient is separately calculated by the ECU 200, based on the difference between the actual braking effectiveness and the estimated braking effectiveness, and stored. The correction reduces the variation in the braking effectiveness of the vehicle, and suppresses the feeling of unnaturalness imparted to the driver when braking.

The ECU 200 may further perform correction by multiplying the target deceleration by a temperature correction coefficient. The temperature correction coefficient may be determined using preset map or the like, in accordance with the brake pad temperature. The brake pad temperature may be measured directly using a temperature sensor, and may alternatively be estimated based on the wheel cylinder pressure or the like. If this is done, it is possible to suppress the variation in the braking effectiveness caused by the variation in the temperature of the brake pad. The ECU 200 may further perform correction by multiplying the target deceleration by a vehicle weight correction coefficient. In the same manner as for the temperature correction coefficient, the vehicle weight correction coefficient may be determined from a preset map or the like, in accordance with the vehicle weight. Alternatively, the vehicle weight may be estimated from, for example, the variation in acceleration of the vehicle. If this is done, it is possible to suppress the variation in the braking effectiveness caused by the change in the vehicle weight.

Next, the ECU 200 calculates the target hydraulic pressure of each wheel cylinder 20 based on the corrected target deceleration (S14). The ECU 200 then controls the pressure booster valves 40 and the pressure reduction valves 42 so that the pressure of each wheel cylinder tracks to the target hydraulic pressure (S16). As a result, the desired braking force is applied to each wheel by pressing brake pads against the brake discs 22.

At this time, the master cutoff valves 27FR and 27FL are closed, and the simulator cutoff valve 23 is open. Therefore, the brake fluid that is sent from the master cylinder 14 by depression of the brake pedal 12 by the driver passes through the simulator cutoff valve 23 and flows into the stroke simulator 24.

Figure 4:
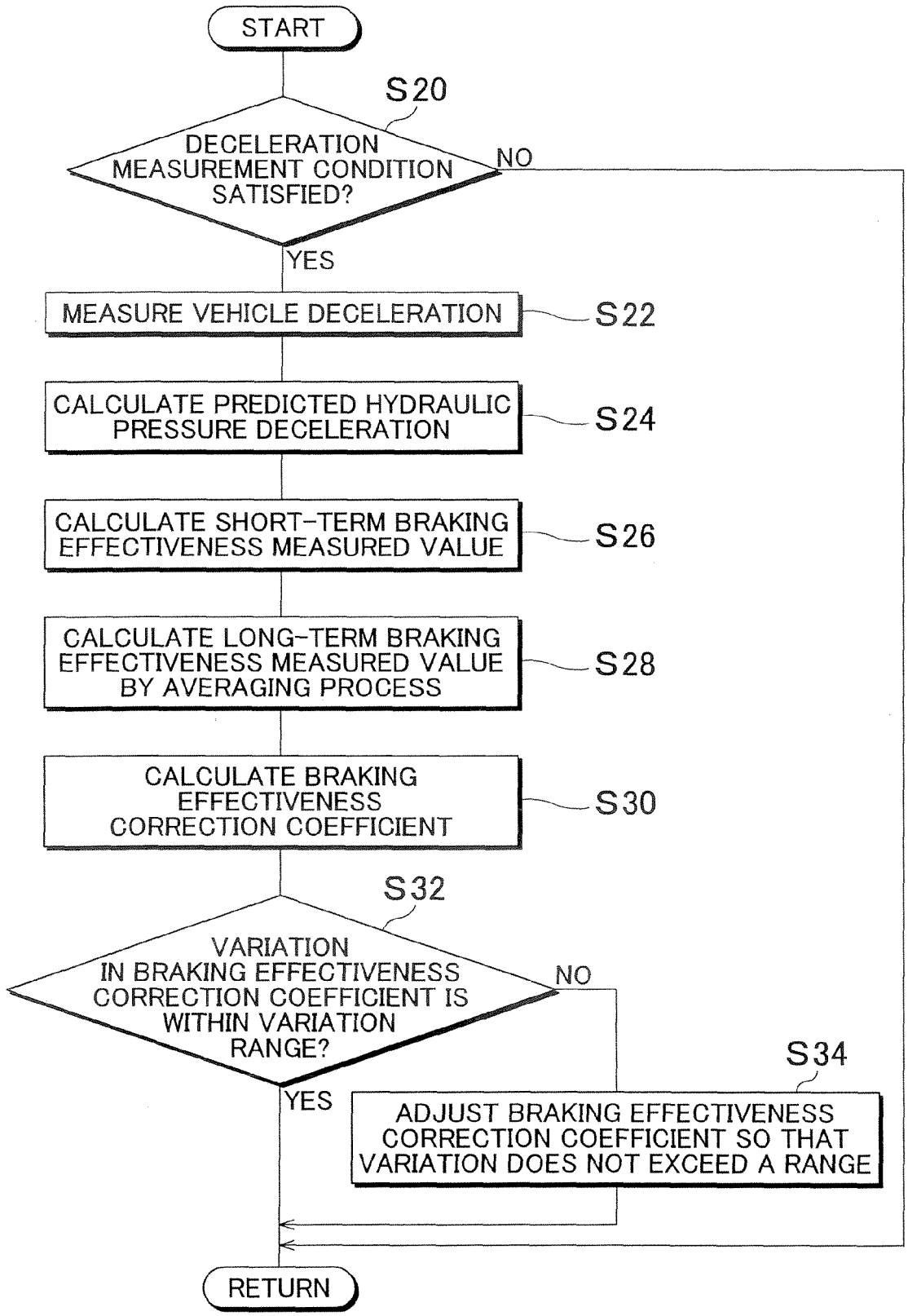
FIG. 4 shows a flowchart indicating an example of learning process for the braking effectiveness in the embodiment of FIG. 1.

FIG. 4 is a flowchart showing an example of the learning process of the braking effectiveness in this embodiment. The ECU 200 learns the variation in the braking effectiveness and successively updates the braking effectiveness correction coefficient. The process shown in FIG. 4 is executed with an appropriate frequency, from the time of the startup to the time of stopping of the drive source of the vehicle. When the learning process shown in FIG. 4 begins, the ECU 200 first determines whether the running condition of the vehicle satisfies a deceleration measurement condition (S20). The deceleration measurement condition is satisfied when, for example, the speed of the vehicle approaches a prescribed speed, this being stored in the ECU 200 beforehand. The prescribed speed of the vehicle may be set in the range, for example, of 10 to 60 km/h.

If the deceleration measurement condition is not satisfied (No at S20), the ECU 200 ends the learning process without updating the braking effectiveness correction coefficient, and restarts the process at the time of the next execution. If, however, the deceleration measurement condition is satisfied, (Yes at S20), the ECU 200 measures the deceleration of the vehicle. The deceleration of the vehicle is measured by the G sensor (accelerometer) 60. In this embodiment the ECU 200 acquires the deceleration of the vehicle by averaging the values measured by the G sensor 60 over a prescribed period of time, for example, over a period of 0.2 s (S22). The ECU 200 also calculates the estimated hydraulic pressure deceleration (S24). The estimated hydraulic pressure deceleration is calculated using the measured value of the wheel cylinder pressure sensors 44, and is the estimated value of the deceleration applied to the vehicle by the disc brake units 21. In this embodiment, the estimated hydraulic pressure deceleration is used as the estimated braking effectiveness by the disc brake units 21.

The ECU 200 calculates the measured value of short-term braking effectiveness based on the measured vehicle deceleration and the estimated hydraulic pressure deceleration (S26). In calculating the measured value of the short-term braking effectiveness the ECU 200 first calculates the deceleration by the hydraulic pressure braking force from the measured vehicle deceleration. The calculated hydraulic deceleration will be referred to as the "actual hydraulic pressure deceleration". The actual hydraulic pressure deceleration is the deceleration imparted to the vehicle by the braking force generated by the supply of brake fluid to the disc brake unit 21.

The ECU 200 subtracts the deceleration caused by factors other than hydraulic pressure braking force from the measured value of vehicle deceleration to calculate the actual hydraulic pressure deceleration. Deceleration by factors other than the hydraulic pressure braking force includes, for example, the deceleration caused by engine braking, the rolling resistance of the wheel and an inclination in the running road surface. The parking brake deceleration occurring when the parking brake is operated is another such factor not related to the hydraulic pressure braking force. In the case of a hybrid vehicle, deceleration by regenerative braking is another such other factor. The ECU 200 calculates the measured value of short-term braking effectiveness based on the difference between the actual hydraulic pressure deceleration and the estimated hydraulic pressure deceleration.

In this embodiment, the ratio between the difference between the actual hydraulic pressure deceleration and the estimated hydraulic pressure deceleration and the estimated hydraulic pressure deceleration is taken as the short-term braking effectiveness measured value, as follows.

> Short-term braking effectiveness measured value=
> (actual hydraulic pressure deceleration−estimated hydraulic pressure deceleration)/estimated hydraulic pressure deceleration If the calculated short-term braking effectiveness measured value exceeds a preset upper limit value or a preset lower limit value, that value may be ignored as an abnormal value and subsequent calculation may not be executed.

Next, the ECU 200 calculates the long-term braking effectiveness measured value by an averaging process (S28). The ECU 200 calculates the long-term braking effectiveness measured value by applying appropriate averaging process to the short-term braking effectiveness measured value. In this embodiment, the ECU 200 calculates the long-term braking effectiveness measured value by, for example, the following equation.

$$X = \alpha \cdot x + (1-\alpha) \cdot X \quad \text{(previous cycle value)}$$

In the above, X is the long-term braking effectiveness measured value and x is the short-term braking effectiveness measured value. The coefficient α is the weighting in the averaging process, this being a value from 0 to 1. That is, in this embodiment, the long-term braking effectiveness measured value X is calculated as a weighted average value of the immediately previous long-term braking effectiveness measured value X and the short-term braking effectiveness measured value x. If the value of α is increased, the long-term braking effectiveness measured value is calculated with emphasis given to the current short-term braking effectiveness measured value, and if the value of α is reduced, the long-term braking effectiveness measured value is calculated with emphasis given to the previous long-term braking effectiveness measured value. The long-term braking effectiveness measured value may also be calculated by a different averaging process, such as by taking a simple average of the short-term braking effectiveness measured values in the past several trips.

The ECU 200 also calculates the braking effectiveness correction coefficient for correcting the target deceleration from the long-term braking effectiveness measured value (S30). As described with reference to FIG. 3, the target deceleration is corrected by multiplying by the braking effectiveness correction coefficient. In this embodiment, the reciprocal of the value obtained by adding 1 to the long-term braking effectiveness measured value, as shown in the following equation, is used.

> Braking effectiveness correction coefficient=1/
> (1+long-term braking effectiveness measured value)

If the actual hydraulic pressure deceleration is small relative to the estimated hydraulic pressure deceleration, that is, if the actual braking effectiveness is insufficient relative to the estimated braking effectiveness, the target deceleration is increased to supplement the braking effectiveness. On the other hand, if the actual hydraulic pressure deceleration is large relative to the estimated hydraulic pressure deceleration, that is, if the actual braking effectiveness is excessive relative to the estimated braking effectiveness, the target deceleration is decreased to suppress braking effectiveness. In this manner, the braking effectiveness is stabilized and the feeling of unnaturalness imparted to the driver when braking is suppressed.

Next, the ECU 200 determines whether the amount of variation in the calculated braking effectiveness correction coefficient is within the variation limitation range of the correction coefficient (sometimes simply called "variation range" hereinafter) (S32). The variation limitation range of the braking effectiveness correction coefficient is set in advance and stored in the ECU 200 to limit the variation in the correction coefficient during one trip of the vehicle. Here, the "trip" means a period from the start to stop of the drive source of the vehicle. In other words, one trip corresponds to one use of the vehicle. A different value is set to the variation range in accordance with factors that causes the difference between the actual hydraulic pressure deceleration and the estimated hydraulic pressure deceleration ("difference factors"). The variation range is defined by a base value, and upper and lower bounds. The upper and lower bounds respectively are the maximum amounts of increase and decrease of the braking effectiveness correction coefficient from the base value.

An example of the base value may be the braking effectiveness correction coefficient at the immediately previous time when the drive source of the vehicle was stopped. In other words, the braking effectiveness correction coefficient that is stored when the ignition key is off can usually be used as the base value. Alternatively, the base value may be the braking effectiveness correction coefficient at the immediately previous time when the drive source was stopped, being corrected to compensate the variation in friction coefficient caused by the temperature of friction member or the vehicle speed.

The upper and lower bound are set in accordance with factors that cause the difference (error) in the braking effectiveness. If the difference factors are the long-term factors, such as abrasion of the friction member of the braking force applying mechanism, vehicle-to-vehicle variations, and so on, the upper and lower bounds are set relatively small, such as one percent (1%) of the base value. This is because the variations in the braking effectiveness caused by these long-term factors are usually not very large. On the other hand, if temporary factors, such as the changes in vehicle weight or changes in temperature of friction members, that are expected to occur during the use of the vehicle and causes the difference in a short term, the upper and lower bounds are set relatively large, such as more than five percent (5%) of the base value, which is larger than that for the long-term factors.

If the asymmetric abrasion of the friction member is large, the variation in braking effectiveness becomes larger, as compared with that in the normal condition. Therefore, the ECU may set the variation range to the value, such as three percent (3%) of the base value, which is larger than that in the normal condition. It is possible to determine whether the asymmetric abrasion of the friction member is large based on the increasing delay of response of the braking force. This is because the larger the asymmetric abrasion of the friction member is, the more amount of brake fluid is required.

Alternatively, the variation range may be set in accordance with the change in tire diameter of each wheel. In this case, the ECU 200 may increase the variation range, as the change in the tire diameter increases. The change in tire diameter can be determined based on the difference (change) in the wheel speed of each wheel. If the changes in tire diameter are different between wheels, the difference in the tire diameter of each wheel can be reflected in the braking force control of each wheel. For example, the target hydraulic pressures may be made different between wheel cylinders 20.

The explanation returns to FIG. 4. If it is determined that the variation in the braking effectiveness correction coefficient is within the variation range (Yes at S32), this process ends without any correction (adjustment) of the braking effectiveness correction coefficient. On the other hand, if it is determined that the variation in the braking effectiveness correction coefficient exceeds the variation range (No at S32), the ECU 200 adjusts the braking effectiveness correction coefficient so that the variation in the braking effectiveness correction coefficient is made within the variation range (S34). For example, if the increase in the braking effectiveness correction coefficient is larger than the upper bound of the variation range, the braking effectiveness correction coefficient is adjusted so that the variation in the braking effectiveness correction coefficient is within the variation range, by making the increase in the braking effectiveness correction coefficient equal to the upper bound of the variation range. Then, the process shown in FIG. 4 ends.

As described above, because the variation limitation range of the braking effectiveness correction coefficient is set in accordance with the factors that cause the difference in braking effectiveness, the variation in the braking effectiveness correction coefficient is limited so that is does not exceed the variation range, even if the actual hydraulic pressure deceleration or the estimated hydraulic pressure deceleration changes abruptly due to some temporary factors. Accordingly, the variation in the braking effectiveness correction coefficient is suppressed, and the braking effectiveness is stabilized.

Figure 5:
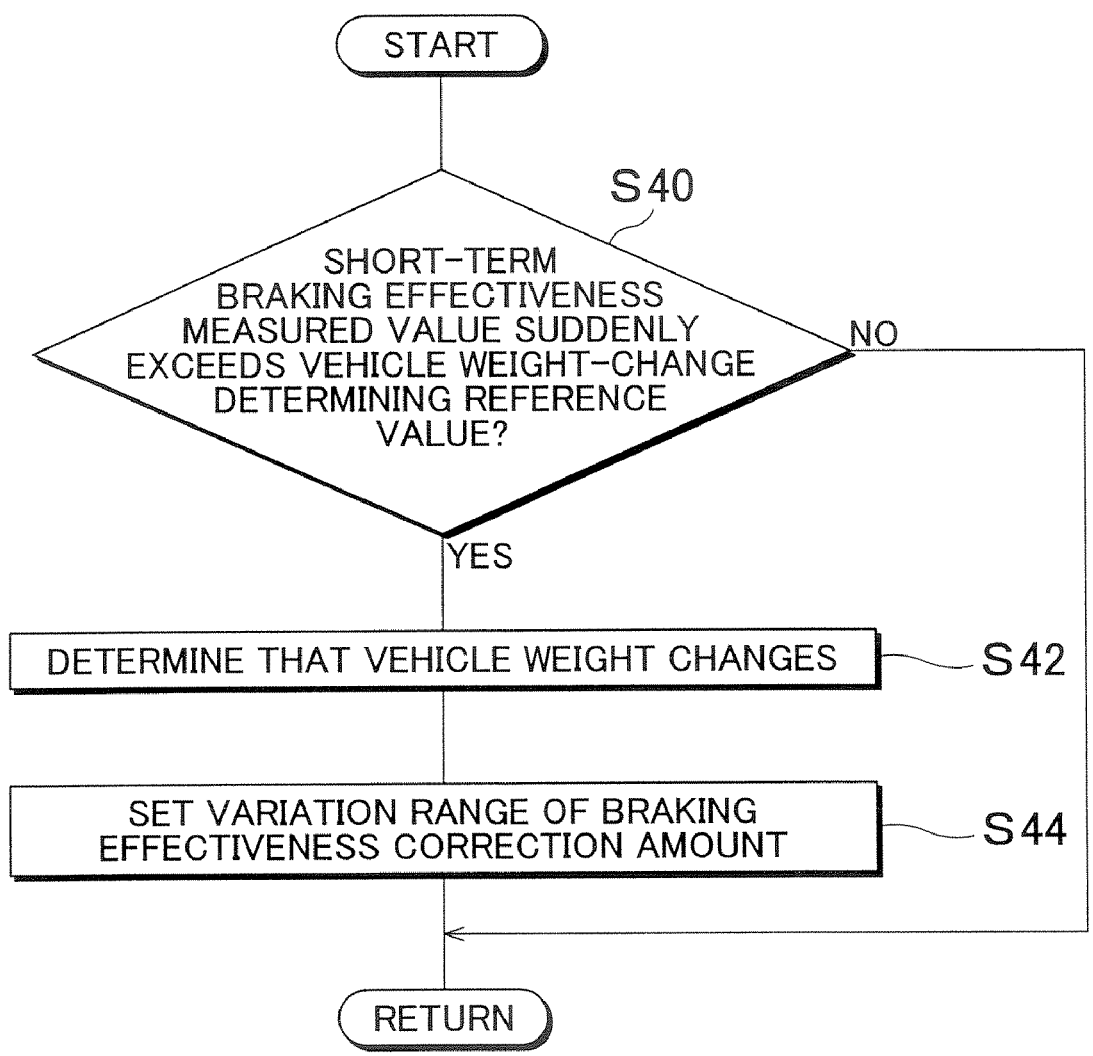
FIG. 5 is a flowchart illustrating an example of a process when the vehicle weight changes, according to the embodiment of the present invention.

Next, an example is described in which the variation limitation range in the braking effectiveness correction coefficient changes when the vehicle weight changes. FIG. 5 is a flowchart illustrating a process when the vehicle weight changes, according to the embodiment of the present invention. The vehicle weight changes, for example, with changes in the number of vehicle passengers and/or the amount of cargo loaded on the vehicle. The process shown in FIG. 5 is performed at prescribed intervals from the time the vehicle is started to the time the drive source of the vehicle is stopped. When the process shown in FIG. 5 starts, the ECU 200 first determines whether the short-term braking effectiveness measured value suddenly exceeds the vehicle weight-change determining reference value (S40). The vehicle weight-change determining reference value is set based on the previously learned result of the variations in the braking effectiveness.

A significantly increased long-term braking effectiveness measured value may be used as the vehicle weight-change determining reference value, for example. The increased amount (i.e., the difference between the significantly increased long-term braking effectiveness measured value and the long-term braking effectiveness measured value) may be set larger than the long-term variation in the braking effectiveness caused by the abrasion etc. of friction member, and may be set smaller than the variation in the braking effectiveness caused by changes in vehicle weight. The long-term variation may be about one percent (1%), for example, and the variation caused by changes in the vehicle weight may be estimated as about ten to fifteen percent (10-15%). Accordingly, the amount of increase in the long-term braking effectiveness measured value to set the vehicle weight-change determining reference value may be determined about five percent (5%). More specifically, for example, the vehicle weight-change determining reference value may be the value obtained by increasing, by about five percent (5%), the long-term braking effectiveness measured value at the immediately previous time when the drive source of the vehicle is stopped. Further, whether the short-term braking effectiveness measured value suddenly exceeds the reference value may be determined by determining whether the short-term braking effectiveness measured value changes rapidly at or above the predetermined rate of change over time.

In short, the ECU 200 determines whether the vehicle weight has changed based on the comparison between the learned result, which is the braking effectiveness that had been learned for the previous trips, and the braking effectiveness in the current trip. The learned result of the previous trips is a long-term average of the braking effectiveness in the past. Accordingly, if the braking effectiveness in the current trip suddenly deviates from the learned result of the previous trips, it can be determined that some factors that vary the braking effectiveness occur in the vehicle. The reason why the factor that newly occurs is determined to be the variation in the vehicle weight is that, it has been experimentally determined that variation in the vehicle weight while the vehicle is moving normally is the most likely factor that suddenly varies the braking effectiveness from the learned result.

Further, to improve the accuracy of the above-described determination of changes in the vehicle weight, the portion of the variation in the braking effectiveness caused by the change in the temperature of the friction member, which is calculated based on the estimated or measured temperature of the friction member, may be subtracted from the short-term braking effectiveness measured value.

The explanation returns to FIG. 5. If it is determined that the short-term braking effectiveness measured value does not exceed the vehicle weight-change determining reference value (NO of S40), the ECU 200 ends the process and restarts the process at the time of next execution. On the other hand, if it is determined that the short-term braking effectiveness measured value suddenly exceeds the vehicle weight-change determining reference value (Yes at S40), the ECU determines that the vehicle weight has changed (S42). Here, it is also possible to identify whether the vehicle weight has increased or decreased. For example, it may be determined that the vehicle weight has increased, when the braking effectiveness decreases, and that the vehicle weight has decreased, when the braking effectiveness increases.

In response to the change in the vehicle weight, the ECU 200 sets the variation range of the braking effectiveness correction coefficient (S44). The variation range of the braking effectiveness correction coefficient is set in accordance with the factors that cause the difference (error) in the braking effectiveness. If the vehicle weight increases, the main factor that causes the difference is changed from the long-term factors, such as the abrasion of the friction member, etc., to the increase of the vehicle weight, which is a temporary factor. At this time, the ECU 200 increases the variation range of the braking effectiveness correction coefficient from the variation range for the long-term factor, such as one percent (1%), to the variation range for the short-term factor as the increase in the braking effectiveness correction coefficient, such as seven percent (7%). The ECU 200 adjusts the braking effectiveness correction coefficient so as not to exceed the increased variation range (S34 in FIG. 4). It is also possible to change the variation range in accordance with the factors other than the change in the vehicle weight, such as the change in the temperature of the friction member or in the vehicle speed. Thus, by increasing the variation range of the correction mount (braking effectiveness correction coefficient) when the temporary factor, such as the variation in the vehicle weight, that is expected when the vehicle is being used, the temporary change in the braking effectiveness can be reduced when the vehicle is being used.

The variation range may be changed at once, or may be changed gradually over time. Even if the determination of the change in the vehicle weight delays from the time of actual change, the braking effectiveness can be changed slowly by gradually changing the variation range. Accordingly, a feeling of unnaturalness imparted to the driver can be reduced. To change the variation range gradually, the variation range can be changed step by step, for example, by about one percent (1%) at every ON or OFF of the brake pedal 12. Alternatively, the variation range may be changed over time, by 0.2% per minute, for example. From the viewpoint of easing the driver into the variation in the braking effectiveness, it is preferable to change the variation range when the vehicle is moving at or above the predetermined speed.

Further, while the control unit calculates a first correction amount for correcting the target value to reduce the influence of the temporary factor on the braking effectiveness, the control unit may concurrently calculate a second correction amount in which the variation caused by the temporary factor is limited. By doing this, the target value can be corrected using the first correction amount to reduce the influence of the temporary factor on the braking effectiveness, and the second correction amount, which limits the influence of the temporary factor on the long-term learned result of the braking effectiveness, can be maintained. By using such a second correction amount in the subsequent trip after the temporary factor is eliminated, the influence of the temporary variation in the correction amount caused by the temporary factor in a trip can be reduced in the subsequent trip.

More specifically, in connection with the above-described embodiment, the braking effectiveness correction coefficient adjusted by using the expanded variation range corresponds to the first correction amount, and the braking effectiveness correction coefficient, in which the variation is limited within the variation range before being expanded. In other words, while the braking effectiveness correction coefficient adjusted by using the expanded variation range is used to correct the target deceleration, the braking effectiveness correction coefficient in which the variation is limited within the variation range before being expanded may still be calculated and stored. The influence of the temporary factors on the braking effectiveness correction coefficient in which the variation is limited by the variation range before being expanded is restrictive. Therefore, by using the braking effectiveness correction coefficient in which the variation is limited by the variation range before being expanded in the trip after the temporary factor is eliminated, the influence of the temporary factors on the subsequent trip can be minimized.

Figure 6:
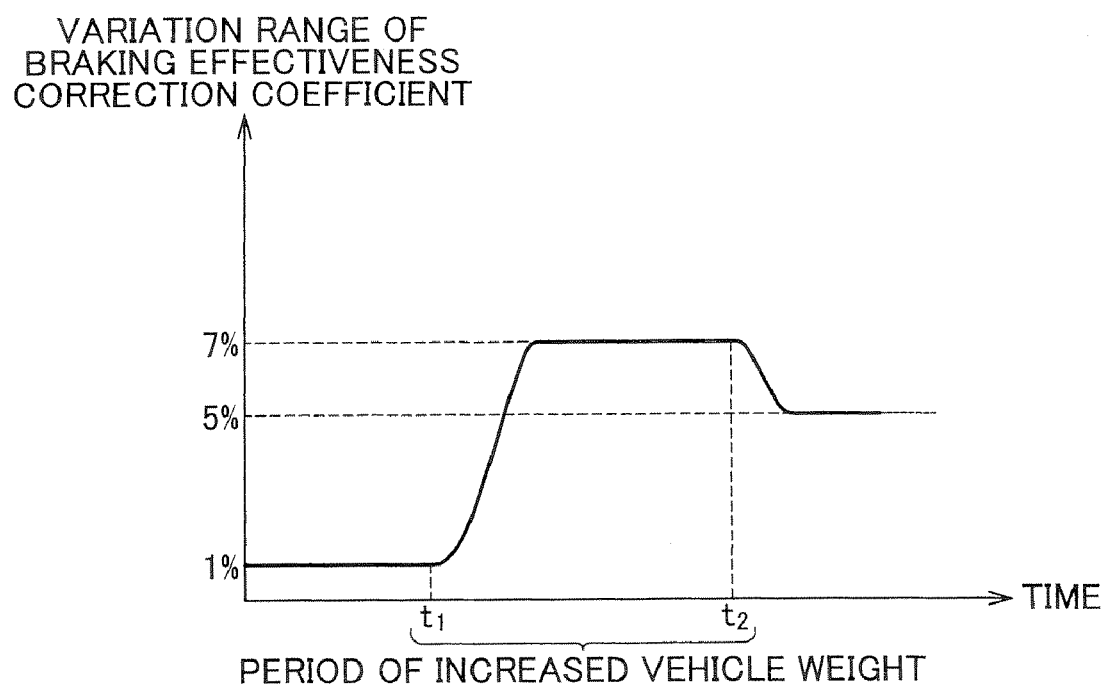
FIG. 6 a view illustrating an example of the variation range of the braking effectiveness correction coefficient when the vehicle weight increases or decreases.

When the temporary factor is eliminated, the variation range may be the same as or different from the variation range before being expanded. For example, an unnatural brake feeling can be reduced, if the variation range after the temporary factor is eliminated is larger than the variation range before the temporary factor occurred. FIG. 6 illustrates an example of the variation range of the braking effectiveness correction coefficient when the vehicle weight changes. The vertical axis represents the variation range of the braking effectiveness correction coefficient, and the horizontal axis represents time. An example is explained with reference to FIG. 6. As shown in FIG. 6, for example, cargo loaded on the vehicle at time t1 increases the vehicle weight, and when the vehicle is unloaded at time t2, the vehicle weight returns to the original condition (weight). In other words, the vehicle weight is increased during the period from time t1 to time t2.

As described above, when the vehicle weight is increased at the time t1, the ECU 200 expands the variation range of the braking effectiveness correction coefficient. Here, the variation range may be gradually increased from the one percent (1%) variation range to the seven percent (7%) variation range. When the vehicle weight is then decreased at the time t2, the ECU 200 reduces the variation range of the braking effectiveness correction coefficient. Here, the variation range is gradually reduced from the seven percent (7%) variation range to the five percent (5%) variation range. Thus, the variation range after the increase of the vehicle weight as the temporary factor that causes the difference is eliminated may be made larger than the variation range before such a difference factor occurred. By doing this, the rapid reduction of the braking effectiveness can be suppressed when the vehicle weight is decreased, and thus, the unnatural brake feeling can be reduced.

Alternatively, the variation range when the vehicle weight is decreased may be set by using, as the base value, the maximum value of the correction amount when the vehicle weight is increased. In this case, the minimum value of the correction amount decreased by the value of the lower bound of the variation range when the vehicle weight is decreased is preferably larger than the maximum value of the correction amount increased by the amount of the upper bound of the variation range before the vehicle weight was increased. According to this as well, the reduction of the braking effectiveness after the increase of the vehicle weight as the temporary difference factor is eliminated can also be suppressed, and thus, the unnatural brake feeling can also be reduced.

For example, as shown in FIG. 6, it is assumed that the variation range is seven percent (7%) of the base value when the vehicle weight is increased. The variation in the braking effectiveness caused by the increase of vehicle weight is typically between about ten to fifteen percent (10-15%). Therefore, because of the increase of the vehicle weight, the variation in the braking effectiveness correction coefficient increases up to the upper bound of the variation range, i.e., the braking effectiveness correction coefficient increases up to the value increased by seven percent (7%) from the braking effectiveness correction coefficient at the immediately previous time when the ignition key was OFF. Then, when it is determined that the vehicle weight is decreased, the ECU 200 sets the variation range to allow the braking effectiveness correction coefficient to vary by a predetermined amount from the base value as the seven percent (7%) increased effective correction coefficient, which is the maximum value of the correction coefficient while the vehicle weight is increased. In the example shown in FIG. 6, the maximum value of the correction coefficient increased by the value of the upper bound of the variation range of the correction coefficient before the vehicle weight is increased is the value increased by one percent (1%) from the braking effectiveness correction coefficient at the immediately previous time when the ignition key is OFF. Therefore, the variation range maybe set to two percent (2%), for example, when the vehicle weight is decreased. By doing this, after the increase in the vehicle weight is eliminated, the braking effectiveness correction coefficient is reduced at most to the value increased by five percent (5%) from the braking effectiveness correction coefficient at the immediately previous time when the ignition key was OFF. As a result, the reduction of the braking effectiveness can be suppressed after the once-increased vehicle weight is decreased.

Further, the difference in the short-term braking effectiveness may sometimes arise from the maintenance operation of the braking force application mechanism. For example, when a brake pad or a brake rotor is replaced, it is predicted that the actual braking effectiveness after the replacement of the brake pad or brake rotor is significantly different from the braking effectiveness that has been learned by the ECU 200 before the replacement of the brake pad or brake rotor. It is desirable to reduce the sudden change in the braking effectiveness that arises due to the difference and to reduce a feeling of unnaturalness imparted to the driver.

Therefore, the ECU 200 changes the braking effectiveness correction coefficient, when a maintenance operation that varies the braking effectiveness is performed. For example, if a brake pad or the like is replaced with a new one in the maintenance operation, it is unnecessary to correct the target deceleration caused by the abrasion of the brake pad or the like. In this case, accordingly, the ECU 200 may reset the braking effectiveness correction coefficient to a preset initial value (before the first operation of the vehicle).

The process to change the correction coefficient accompanied by the maintenance operation may be performed manually or automatically by the ECU 200 when a predetermined condition indicating that the maintenance operation is performed is satisfied. For example, it may be determined that the maintenance operation has been performed when a pulse signal from the wheel speed sensor is detected when the ignition key is set OFF This is because, during the maintenance operation, it is predicted that the ignition key is usually set OFF, and the wheel is rotated by a certain amount by the maintenance operation. The wheel speed sensor generates a pulse signal by the rotation of the wheel, and the ECU 200 determines that the maintenance operation has been performed based on the pulse signal.

As another condition, for example, it may be determined that the maintenance operation has been performed, if the control response of the wheel cylinder pressure when the ignition key is turned ON is different from that in the immediately previous trip. This is because the amount of the abrasion of the brake pad and the like affects on the control response of the wheel cylinder pressure. Alternatively, it is also possible to determine whether the maintenance operation has been performed based on the change in the amount of fluid in the reservoir tank 26, which stores brake fluid. This is because the amount of the brake fluid stored in the reservoir tank 26 increases, as the amount of abrasion of the brake pad and the like is smaller. In addition, for example, if a maintenance operation, such as an air-bleeding operation of the brake fluid, is performed, in which a diagnostic tool is used, the ECU 200 can directly detect that the maintenance operation.

Meanwhile, if the ECU erroneously determines that the operation has been performed, even though the maintenance operation has not actually been performed, the braking effectiveness may rather be changed suddenly after the ECU automatically resets the correction coefficient to the initial value. Consequently, the ECU 200 may increase or decrease the correction coefficient by a constant amount to the initial value, rather than immediately reset it to the initial value. The ECU 200 may increase or decrease the correction coefficient by, for example, several to several dozen percent of the difference between the initial value and the correction coefficient after the maintenance operation.

In this case, the correction coefficient may be changed at a constant rate independent of the value of correction coefficient, or at a greater rate as the correction coefficient is more apart from the initial value. FIG. 7 is a graph illustrating an example of a relationship between the correction coefficient and the variation range. In FIG. 7, the horizontal axis represents the correction coefficient, and the vertical axis represents the variation range of the correction coefficient allowed in a trip. FIG. 7 shows the upper limit m1 and the lower limit m2 of the variation range of the correction coefficient, Both the upper limit m1 and the lower limit m2 decrease as the correction coefficient increases. In FIG. 7, both the upper limit m1 and the lower limit m2 decrease linearly with respect to the increase of the correction coefficient. However, they are not limited thereto, and may change according to a curve.

Here, the upper limit and the lower limit of the variation range of the correction coefficient are respectively a1 and b1, when the correction coefficient is k1, and the upper limit and the lower limit of the variation range of the correction coefficient are respectively a2 and b2, when the correction coefficient is k2. The correction coefficient k2 is greater than the correction coefficient k1. In addition, the upper limits a1 and a2 are positive values, and the lower limits b1 and b2 are negative values.

Then, the upper limit a1 of the variation range for the correction coefficient k1 is greater than the upper limit a2 of the variation range for the correction coefficient k2. As a result, the maximum amount of increase in the correction coefficient in one trip is greater when the correction coefficient is k1 rather than that of when the correction coefficient is k2. Similarly, the lower limit b1 of the variation range for the correction coefficient k1 is greater than the lower limit b2 of the variation range for the correction coefficient k2. As s result, the maximum amount of reduction in the correction coefficient in one trip is greater when the correction coefficient is k2, rather than that of when the correction coefficient is k1. In other words, as the correction coefficient increases, the maximum amount of increase in the correction coefficient allowed in one trip decreases, and the maximum amount of reduction increases. By doing this, the braking effectiveness is changed less suddenly, as compared with when the correction coefficient is immediately returned to the initial value, and the excessively increased correction coefficient can be reduced relatively quickly.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A brake system, comprising:
 a braking force application mechanism that presses a friction member against a braked member to apply a braking force to a wheel of a vehicle; and
 a control unit that
 calculates an index that indicates a difference between an expected braking effectiveness and an actual braking effectiveness,
 corrects a target value, which is set to control a pressing force of the friction member, in accordance with the index, to reduce variation between the actual braking effectiveness and the expected braking effectiveness of the vehicle, and
 changes a variation range depending upon whether a factor that causes the difference is a temporary factor or a long-term factor,
 wherein the control unit uses the variation range to limit an available variation in a correction amount to correct the target value and, the temporary factor and long-term factor respectively cause the difference on a short-term and long-term basis,
 wherein the control unit expands the variation range, when the difference between the expected braking effectiveness and the actual braking effectiveness is increased by the temporary factor that arises in the course of using the vehicle, and
 wherein the control unit detects an increase in a vehicle weight as the temporary factor, and sets a larger variation range after the increase in the vehicle weight is eliminated, as compared with the variation range before the increase in the vehicle weight.

2. The brake system according to claim 1, wherein the control unit sets the variation range so that the variation in the correction amount necessary to compensate for a long-term increase in the difference between the expected braking effectiveness and the actual braking effectiveness is within the variation range.

3. The brake system according to claim 1, wherein the control unit accepts the variation in the correction amount that exceeds the variation range, when the difference between the expected braking effectiveness and the actual braking effectiveness is increased by the temporary factor that arises in the course of using the vehicle.

4. The brake system according to claim 1, wherein, when the index suddenly exceeds a predetermined reference value, the control unit determines that the factor is a change in a vehicle weight.

5. The brake system according to claim 1, wherein the braking force application mechanism presses the friction member to the braked member by supplying a hydraulic fluid,
the control unit calculates an actual hydraulic pressure deceleration caused by the braking force application mechanism from a measured deceleration of the vehicle, calculates an estimated hydraulic pressure deceleration using a hydraulic pressure supplied by the braking force application mechanism, and corrects the target value in accordance with a difference between the estimated hydraulic pressure deceleration and the actual hydraulic pressure deceleration.

6. The brake system according to claim 1, wherein the control unit changes the correction amount to a preset value when a sudden change in the actual braking effectiveness is expected.

7. The brake system according to claim 6, wherein the control unit resets the correction amount to an initial value.

8. The brake system according to claim 6, wherein the control unit changes the correction amount so that the correction amount approaches an initial value.

9. The brake system according to claim 6, wherein the control unit changes the correction amount if a maintenance operation is detected.

10. The brake system according to claim 1, wherein the control unit changes the variation range of the correction amount in accordance with a variation in a tire diameter.

11. The brake system according to claim 1, wherein the control unit sets a wider variation range when the factor is the temporary factor, as compared with when the factor is the long-term factor.

12. The brake system according to claim 1, wherein the actual braking effectiveness and expected braking effectiveness are an actual deceleration of the vehicle and an estimated deceleration of the vehicle, respectively.

13. The brake system according to claim 1, wherein the temporary factor that causes the difference is a weight of the vehicle.

14. The brake system according to claim 1, wherein an upper limit of the variation range when the correction amount is a first value k1 is greater than when the correction amount is a second value k2, which second value k2 is greater than the first value k1.

15. A brake system, comprising:
a braking force application mechanism that applies a braking force to a wheel of a vehicle by pressing a friction member to a braked member; and
a control unit that
calculates an index that indicates a difference between an actual braking effectiveness and a target braking effectiveness,
calculates a correction amount of a target value, which is set to control a pressing force of the friction member, in accordance with the index,
changes a variation range of the correction amount depending upon whether a factor that causes the difference is a temporary factor or a long-term factor, limiting the calculated correction amount to be within the variation range, and
corrects the target value using the calculated correction amount to reduce a variation between the actual braking effectiveness and the target braking effectiveness,
wherein the temporary factor and long-term factor respectively cause the difference on a short-term and long-term basis,
wherein the control unit expands the variation range, when the difference between the expected braking effectiveness and the actual braking effectiveness is increased by the temporary factor that arises in the course of using the vehicle, and
wherein the control unit detects an increase in a vehicle weight as the temporary factor, and sets a larger variation range after the increase in the vehicle weight is eliminated, as compared with the variation range before the increase in the vehicle weight.

16. The brake system according to claim 15, wherein the actual braking effectiveness and target braking effectiveness are an actual deceleration of the vehicle and a target deceleration of the vehicle, respectively.

* * * * *